Figure 1:
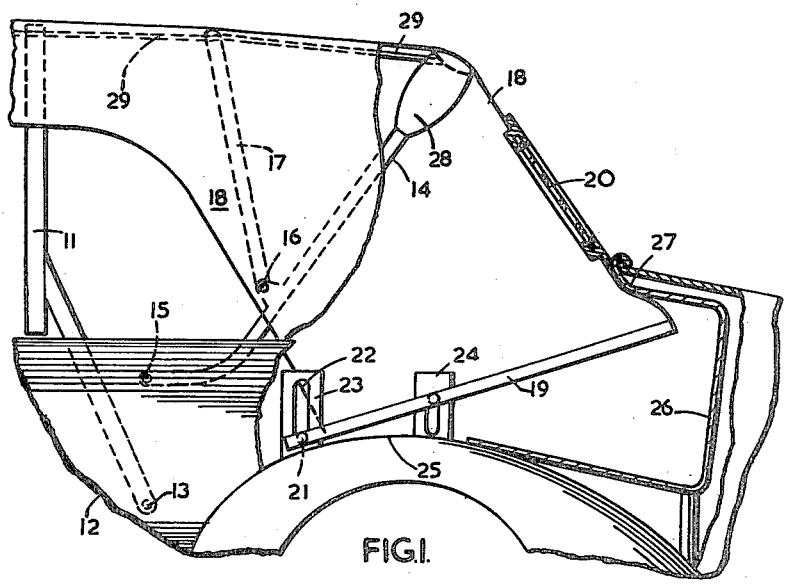

June 28, 1955   J. H. ORR   2,711,924
LET-DOWN COLLAPSIBLE TOP FOR MOTOR VEHICLES
Filed July 25, 1952

INVENTOR
JOHN HEWITT ORR
Mawhinney & Mawhinney
ATTYS.

2,711,924

LET-DOWN COLLAPSIBLE TOP FOR MOTOR VEHICLES

John Hewitt Orr, Coventry, England, assignor to Carbodies Limited, Coventry, England Application July 25, 1952, Serial No. 300,803

Claims priority, application Great Britain September 15, 1951

4 Claims. (Cl. 296—107)

The invention relates to an open-type motor-car body of the kind having a foldable head or top of which a flexible covering, when the head is erected, is supported at the rear from the top of the body and at the front from a forward, substantially U-shaped, transverse member of a foldable frame, the latter including a second substantially U-shaped, transverse member which defines the top of a rear panel of the head, the rear panel incorporating a rigid rear light (i. e., a transparent pane providing a view to the rear), and the head being retractable into a stowage compartment which is at the rear and sides of the body and has its outer upper edge defined by the top of the body.

With known constructions of this kind the bottom edge of the flexible covering, at least at the rear, is secured to the top of the body and the rear panel incorporates substantially horizontally-extending strips of the flexible covering above and below the rear light when the head is erected. When the head is stowed in the compartment, the rear light lies substantially vertical with the remainder of the folded head substantially within the compartment. When raising the head, the said second member must precede the rear light in leaving the compartment, passing the vertical rear light in doing so, and the two said strips must be of sufficient width to allow the rear light to be turned completely from the position in which it is hung inverted from the top of the body to that in which it is hung erect from the said second member. This requirement normally restricts the depth of the rear light to one-third of the height of the rear panel (i. e., when the head is erected).

The object of the invention is a construction of head permitting the height of the rear light to be materially increased proportionally to the height of the rear panel.

According to the invention the bottom edge of the covering is supported from a rigid movable member, which, when the head is erected, engages an abutment, within the compartment, for anchoring the covering at the rear and which occupies a lower level in the compartment when the head is stowed, the lower edge of the rear light being supported from the rigid member so that, when the rigid member moves to occupy its said lower level the said member draws down the rear light to be wholly within the compartment, and the covering being unattached to the said second member so that it can slide thereover, during stowing of the head, to provide a lap of the covering of a sufficient length to enable the said second member, and the remainder of the head, to be stowed compactly without biasing the rear light into an obstructing position. Thus the lower edge of the rear light can be fast with the rigid member so as to lie substantially vertically outside the path of the remainder of the head to the stowed position, or the lower edge of the rear light can be sufficiently spaced from the rigid member for an intervening strip of the fabric to act as a hinge for the rear light to enable it to lie substantially horizontal with the remainder of the head above it when stowed. In this way the height of the rear light can be made almost the total height of the rear panel when the head is erected.

So that the said second member of the frame can be made to assume its proper position when the head is erected, that member can be tied by a flexible strip (e. g., of webbing) to the said forward member of the movable frame and to the rigid movable member.

The floor of the stowage compartment can be rigid and form the roof of a luggage compartment of the body, or the said floor may be provided by a flexible sheet (e. g., of canvas) which overlies the luggage compartment and can be deflected upwardly, if necessary, when inserting an item of luggage.

Figure 2:
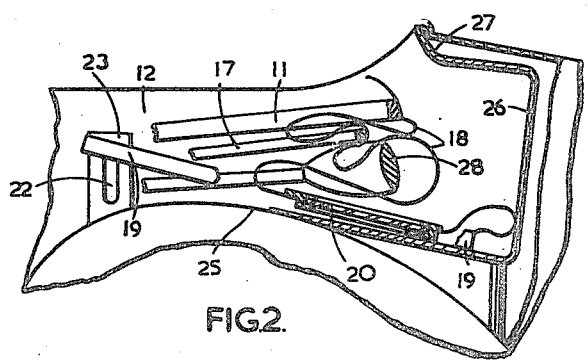

In the accompanying drawings:

Figure 1 is a side elevation, partly in section, of a rear portion of a motor-car showing, in erected position, a head according to the invention; and Figure 2 is a section, in a plane parallel to and behind that of Figure 1, showing the head in the stowed position.

Referring to the drawings the foldable head frame is shown as comprising a forward, substantially U-shaped transverse member 11, which is pivoted internally of the body at 12 and 13, and a second substantially U-shaped transverse frame member 14 which is pivoted from the body at 15.

To the frame member 14 is pivoted at 16 an intermediate substantially U-shaped transverse frame member 17, and these three frame members support the fabric covering 18 when the head is erected. The lower edge of the fabric is made fast with a rigid U-shaped member 19 having its arms directed forwardly, and between the members 14 and 19 the fabric forms the rear panel in which is secured, in any suitable way, a rear light 20.

The forward ends of the arms of the member 19 are provided with laterally extending pins 21 working in vertical slots 22 of respective brackets 23 which are fast with the body 12, and the said arms, intermediate their ends have similar pins coacting with other slotted brackets 24 which are also fast with the body. By supporting the member 19 from the body in this way it is possible to avoid the internal wheel arch, indicated at 25, of the body interfering with the movement of the member 19.

Within the rear of the body is a stowage compartment 26 having an inwardly directed top edge portion 27, which is continued round the sides of the body, for engagement with the outer surface of the fabric 18 when the head is erected.

When erected the fabric 18 is tautened by the upward movement of the member 19 being limited by the slots of the brackets 24, with the pins 21 at the bottoms of the slots 22.

The fabric 18 is not connected to the frame member 14 and the latter is conveniently broadened as shown at 28, both to avoid a high intensity of pressure on the fabric and to provide a preferably smooth surface over which the fabric can slide.

When the head is lowered into the position shown in Figure 2 the member 19 drops to the bottom of the compartment 26, and the strip of fabric between the member 19 and the bottom edge of the light 20 allows the latter to lie flatly in the bottom of the compartment. The member 19 in assuming this position falls to the bottom of the slots in the brackets 24 and the pins 21 rise up the slots 22 as shown, the arms of the member 19 possibly rolling on the tops of the wheel arches.

During this lowering movement the fabric can be drawn over the frame member 14, by the weight of the member 19, to provide a sufficient lap of the fabric for enabling the light 20 to lie flat.

The frame members 11, 14 and 17 are interconnected by one or more strips of webbing 29 whereby they are automatically raised to their appropriate positions, when the head is erected, without unduly stressing the fabric 18.

It will be seen that by securing the bottom edge of the fabric to the member 19, which latter, when the head is erected, is held below the upper edge of the body 12, the rear panel of the head extends to below the said upper edge and thus enables the light 20 to occupy more than one-third of the height of the portion of the rear panel which extends above the body. In this way a motorist is provided with an improved field of view through the rear light 20.

What I claim as my invention and desire to secure by Letters Patent of the United States is:

1. An open-type motor-car body having a top comprising a foldable frame pivoted to the body for movement between an erected position and a position in which the top is folded and stowed in a compartment at the rear and sides of the body, and a flexible covering for said frame attached at its front edge to the front of said frame, said convering including a rear panel of which the top edge in the erected position rests upon and is supported by a transverse member of said frame without being attached to said transverse member, a single rigid transparent pane in said rear panel of a height exceeding one third of the height of the rear panel, a rigid member in said compartment having forwardly a hinge-like connection with the body and having its rear end connected to the bottom edge of said covering, abutment means limiting upward movement of the rear end of said rigid member when the top is erected whereby to tension said covering, and said rigid member being free to move about its hinge-like connection by gravity during stowing of the top and in so doing to draw a sufficient length of said covering, over said transverse member, to allow said top to be stowed compactly in said compartment with said pane lowermost and in a substantially horizontal position.

2. An open-type motor-car body, according to claim 1, characterized in that the said rigid member is substantially U-shaped in plan, with each of its arms directed forwardly and having a hinge-like connection with said body, the bottom edge of said covering being connected to the bridging part at the rear of said rigid member.

3. An open-type motor-car body, according to claim 1, characterized in that said rigid member is U-shaped in plan view with its arms directed forwardly and with its rear bridging portion connected to said covering, each of its arms having a hinge-like connection with opposite sides of the body, each of said hinge-like connections including upright fore-and-aft guide means respectively fast with the adjacent side of the body, and pins spaced along the associated arm working in said guide means.

4. An open-type motor-car body, according to claim 1, and having also a flexible strip interconnecting the front of said frame and said transverse member whereby, when erecting the top, said transverse member will be raised to its erected position.

References Cited in the file of this patent

UNITED STATES PATENTS

| | | |
|---|---|---|
| 1,809,505 | Campbell | June 9, 1931 |
| 2,000,626 | Votypka | May 7, 1935 |
| 2,560,493 | Spring | July 10, 1951 |

FOREIGN PATENTS

| | | |
|---|---|---|
| 447,641 | Great Britain | May 22, 1936 |